(No Model.)
J. F. CUMMINGS.
UNDERGROUND CONDUIT FOR ELECTRICAL CONDUCTORS.
No. 524,977. Patented Aug. 21, 1894.
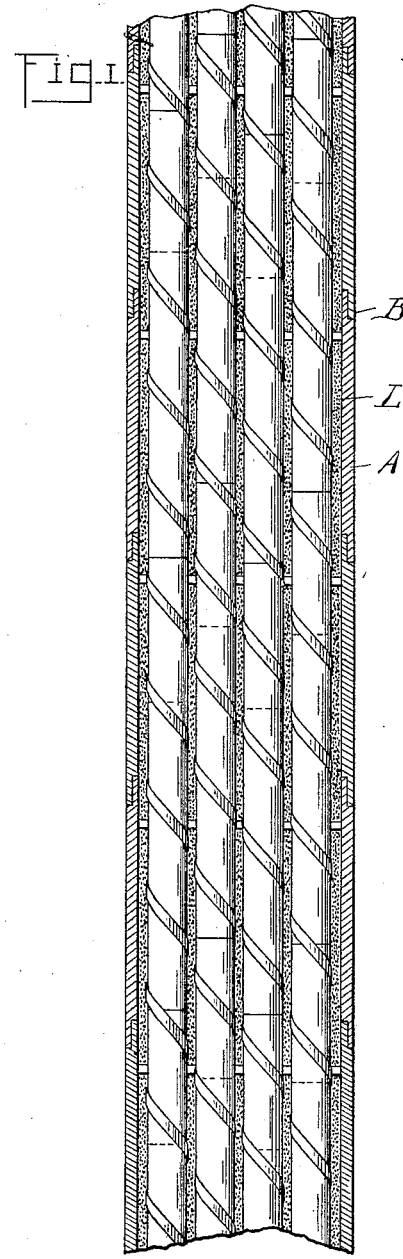
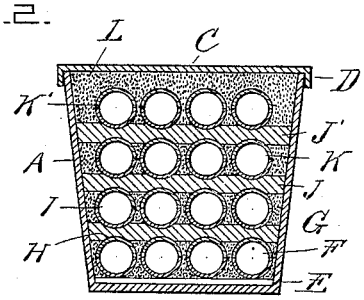
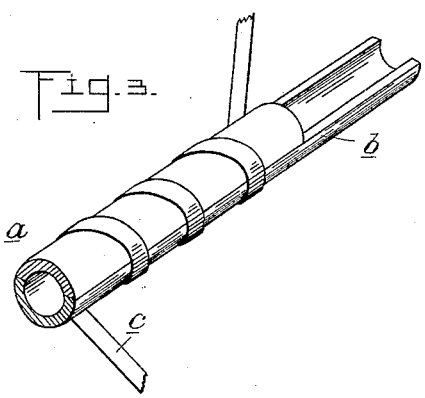
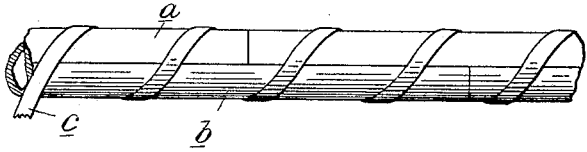
Witnesses:
Inventor
James F. Cummings,
By his Atty's.

UNITED STATES PATENT OFFICE.

JAMES F. CUMMINGS, OF DETROIT, MICHIGAN, ASSIGNOR OF ONE-HALF TO EUGENE M. ENGELMAN, OF MILWAUKEE, WISCONSIN.

UNDERGROUND CONDUIT FOR ELECTRICAL CONDUCTORS.

SPECIFICATION forming part of Letters Patent No. 524,977, dated August 21, 1894.

Application filed January 17, 1893. Renewed January 17, 1894. Serial No. 497,202. (No model.)

*To all whom it may concern:*

Be it known that I, JAMES F. CUMMINGS, a citizen of the United States, residing at Detroit, in the county of Wayne and State of Michigan, have invented certain new and useful Improvements in Underground Conduits for Electrical Conductors, of which the following is a specification, reference being had therein to the accompanying drawings.

This invention relates to new and useful improvements in underground conduits for electrical conductors, and the invention consists in the peculiar construction of the ducts in which the wires are to be carried, the same being made of semicylindrical sections arranged to form a tube to break joints and secured together preferably by a binding tape bound spirally about. One or more of these ducts are arranged in a conduit or casing, then preferably a filling of non-conducting material is placed around them and the cover is placed upon the conduit.

The invention further consists in the peculiar construction, arrangement and combination of the various parts, all as more fully hereinafter described.

In the drawings, Figure 1 is a horizontal section through my improved conduit. Fig. 2 is a cross section thereof. Fig. 3 is a detached perspective view of the end of one of the ducts, showing the manner of construction. Fig. 4 is a side elevation of a portion of one of the ducts.

A casing for the duct is made preferably of cast iron, being formed in trough like sections A, preferably slightly larger at the top than at the bottom and constructed so that the ends of the adjoining sections will overlap, as shown at B. The casing is also provided with a suitable cover C, preferably having the downward extending flanges D at the sides to prevent the ingress of water or dirt. Preferably cast integral with the casing across the bottom thereof is a series of ribs E, which act as a support for the lower series of ducts F. When these ducts (which are preferably constructed as hereinafter described) are arranged in position, bridges G having grooves or notches H one for each duct at top and bottom are placed upon the lower horizontal section and a second horizontal series I is placed in the conduit.

Bridges J and J' and horizontal series of ducts K K' may be used if necessary. The duct is then filled at the top with any suitable non-conducting material, such as asphaltum, as shown at L and the cover C is placed in position.

The construction of the duct is as follows: Each duct is in the shape of a tube, preferably semi-cylindrical although it may be a rectangular tube if desired. Each duct is formed of two sections *a* and *b* forming supplementary portions of the tube. In constructing this duct in the conduit I preferably lay the first half in the conduit and lay in the wire or cord to which the wire is to be attached, then place upon that half the top to form a tube, so arranging the sections *a b* that the tube formed will have so called break-joints, that is the joint of one half will be intermediate the other half. The two halves are then secured together in any desired manner, preferably by means of a tape *c* wound spirally about the two sections, as plainly shown in Figs. 3 and 4. The ducts thus constructed are then preferably arranged, as shown in Figs. 1 and 2 and the filling of non-conducting material poured about them and the cover placed in position. Making these sections of the conduit semicylindrical or sections of a tube, it is evident that they may be economically made, much more so than could be done if the tube had to be bored, for the holes required are small and in boring tubes of the necessary length it has been found impracticable on account of the splitting of the material, &c. The wood forms a good non-conductor and at the same time will absorb any moisture that may be inside the tube.

What I claim as my invention is—

1. An underground conduit for electric conductors, consisting of an outer casing, a series of conduits within the same formed in sections with overlapping ends, and a spirally arranged binder on the same, a series of supports in the casing and a filling of insulating material surrounding the inner conduits, substantially as described.

2. An underground conduit for electric conductors consisting of a series of tubes divided longitudinally and arranged with their ends over lapping, spirally wound binders for the tubes and supports for the tubes arranged at intervals, substantially as described.

In testimony whereof I affix my signature in presence of two witnesses.

JAMES F. CUMMINGS.

Witnesses:
M. B. O'DOGHERTY,
N. L. LINDOP.